United States Patent
Rohland

(10) Patent No.: US 11,401,687 B2
(45) Date of Patent: Aug. 2, 2022

(54) SURFACE SUPPORT ASSEMBLY FOR SUPPORTING A WORKING MACHINE

(71) Applicant: Volvo Construction Equipment AB, Eskilstuna (SE)

(72) Inventor: Axel Rohland, Riol (DE)

(73) Assignee: Volvo Construction Equipment AB, Eskilstuna (SE)

( * ) Notice: Subject to any disclaimer, the term of this patent is extended or adjusted under 35 U.S.C. 154(b) by 58 days.

(21) Appl. No.: 16/965,168

(22) PCT Filed: Feb. 13, 2018

(86) PCT No.: PCT/EP2018/053586
§ 371 (c)(1),
(2) Date: Jul. 27, 2020

(87) PCT Pub. No.: WO2019/158188
PCT Pub. Date: Aug. 22, 2019

(65) Prior Publication Data
US 2021/0054596 A1   Feb. 25, 2021

(51) Int. Cl.
*E02F 9/08* (2006.01)
*B60S 9/12* (2006.01)

(52) U.S. Cl.
CPC .............. *E02F 9/085* (2013.01); *B60S 9/12* (2013.01)

(58) Field of Classification Search
CPC .... E02F 9/085; E02F 9/08; B60S 9/12; B60S 9/00; B60S 9/14; B60S 9/02; B60S 9/04; B66C 23/78; B66C 23/80
See application file for complete search history.

(56) References Cited

U.S. PATENT DOCUMENTS 3,438,509 A   4/1969 Munz
4,118,054 A * 10/1978 Vigerie .................. B66C 23/80
                                                             212/304

(Continued)

FOREIGN PATENT DOCUMENTS

CN   204777025 U     11/2015
CN   107227849 A *   10/2017
(Continued)

OTHER PUBLICATIONS

Translated copy of DE-20120964-U1 (Year: 2021).*
(Continued)

*Primary Examiner* — James A Shriver, II
*Assistant Examiner* — Ian Bryce Shelton
(74) *Attorney, Agent, or Firm* — Sage Patent Group

(57) ABSTRACT

The invention relates to a support assembly for supporting a vehicle including an articulated interconnecting assembly pivotable connectable to a lower part of the working machine; a telescopic arrangement connected to said articulated interconnecting assembly and including a guiding frame and a telescopic extension member displaceable arranged relative the guiding frame; a foot connected to said telescopic extension member; an articulated linkage arrangement having a linkage arm connectable at one end to a linear actuator for effecting a movement of said articulated interconnecting arrangement and at a second end pivotable connected to one end of a connecting rod, said connecting rod being pivotable connected to the telescopic extension member at a second end, wherein said telescopic extension member includes a channel for accommodating a portion of the connecting rod.

13 Claims, 10 Drawing Sheets

(56) References Cited

U.S. PATENT DOCUMENTS

| | | | | |
|---|---|---|---|---|
| 5,383,563 | A | * | 1/1995 | Richtsfeld ............... B66C 23/80 212/304 |
| 5,706,960 | A | * | 1/1998 | Pitman .................... B66C 23/80 212/304 |
| 6,227,569 | B1 | * | 5/2001 | Dingeldein .............. B60S 9/10 212/304 |
| 7,331,607 | B1 | * | 2/2008 | Schneider ............... B66C 23/80 280/763.1 |
| 8,657,335 | B2 | * | 2/2014 | Borghi .................... B66C 23/80 280/765.1 |
| 10,081,288 | B1 | * | 9/2018 | Downing ................. B66C 13/54 |
| 10,221,541 | B1 | * | 3/2019 | Colbert ................... E02F 3/964 |
| 2012/0261213 | A1 | * | 10/2012 | St-Yves ................... B60S 9/12 182/64.1 |
| 2016/0024751 | A1 | * | 1/2016 | Iotti ........................ B66C 23/80 280/765.1 |
| 2017/0341918 | A1 | * | 11/2017 | Richardson ............ B66F 11/04 |
| 2018/0170322 | A1 | * | 6/2018 | Gallione .................. B60S 9/10 |
| 2019/0047831 | A1 | * | 2/2019 | Moose ..................... B66C 23/36 |

FOREIGN PATENT DOCUMENTS

| | | | | | |
|---|---|---|---|---|---|
| DE | 1961193 | A | | 6/1971 | |
| DE | 1961193 | A1 | * | 6/1971 | ............ B66C 23/80 |
| DE | 2501461 | A1 | | 7/1976 | |
| DE | 20120964 | U1 | * | 6/2003 | ............ E02F 9/085 |
| DE | 10219214 | A1 | * | 11/2003 | ............ E02F 9/085 |
| EP | 0072697 | A1 | * | 2/1983 | ............ E02F 9/085 |
| EP | 0072697 | A1 | | 2/1983 | |
| EP | 2107034 | A1 | * | 10/2009 | ............ B66C 23/80 |
| EP | 3031769 | A1 | * | 6/2016 | ............ B66C 23/78 |
| FR | 1465606 | A | * | 1/1967 | ............ B66C 23/80 |
| FR | 2387144 | A1 | * | 11/1978 | ............ E02F 9/085 |
| FR | 2498140 | A1 | * | 7/1982 | ............ B66C 23/80 |
| FR | 2831569 | A1 | * | 5/2003 | ............ E02F 3/8157 |
| KR | 20080056562 | A | * | 6/2008 | |
| KR | 20090071205 | A | * | 7/2009 | ............ E02F 9/085 |
| KR | 20110072579 | A | * | 6/2011 | |
| WO | WO-9964685 | A1 | * | 12/1999 | ............ B66C 23/80 |
| WO | WO-2009141840 | A1 | * | 11/2009 | ................ B60S 9/10 |
| WO | WO-2016087824 | A1 | * | 6/2016 | ............ B66F 11/04 |

OTHER PUBLICATIONS

International Search Report and Written Opinion of the International Searching Authority, PCT/EP2018/05358, dated Oct. 24, 2018, 11 pages.

Chinese First Office Action dated Sep. 28, 2021 for Chinese Patent Application No. 201880088298.2, 11 pages (including English summary).

* cited by examiner

SURFACE SUPPORT ASSEMBLY FOR SUPPORTING A WORKING MACHINE

CROSS REFERENCE TO RELATED APPLICATIONS

This application is a 35 U.S.C. § 371 national stage application of PCT International Application No. PCT/EP2018/053586 filed on Feb. 13, 2018, the disclosure and content of which is incorporated by reference herein in its entirety.

TECHNICAL FIELD

The invention relates to a support assembly for supporting a working machine. In particular, the support assembly is intended for supporting a working machine operating in a standstill position. The invention also relates to a vehicle comprising such a support assembly, e.g. a working machine in the form of an excavator comprising such an assembly. The invention is applicable on vehicles, in particular working machines within the fields of industrial construction machines or construction equipment, such as excavators. Although the invention will mainly be described in relation to an excavator, it may also be applicable for other types of vehicles and working machines such as e.g. wheel loaders, cranes. The invention is particularly applicable for various types of excavators, such as mechanical shovels, drillers, compact excavators, wheeled excavators, crawler excavators. Such excavators may be a tracked swilling excavators comprising either a caterpillar track or wheels.

BACKGROUND

A working machine may be used for many purposes. Examples of working machines include, but are not limited to wheel loaders and excavators. Excavators are generally used in various loading operations such as scooping excavation of scooping up the earth and sand using a bucket, a swing operation of swinging or revolving an upper swing body, a dumping operation of loading the earth and sand to the dump truck and a return swing operation of returning the upper swing body to a position associated with the scooping excavation.

In connection with these types of operations, the working machine such as an excavator may need to be further supported or stabilized by outriggers, which are commonly known in the art. An outrigger, or outrigger assembly, is a type of support assembly connected to the lower frame of the working machine and configured to stabilize or prevent a parked vehicle or a travelling vehicle from tilting. By way of example, these types of support assemblies are commonly found on excavators or other types of construction vehicles that become generally top-heavy due to a crane mast or an extension ladder extending from the vehicle. When the working machine parks to perform its operation, the outrigger is extended sideways from the stationary vehicle and downward against the ground to widen the vehicle's base. When the service operation is complete, the outrigger is returned to a stored position, so as not to impede the vehicle's travel. The outriggers may also provide stability and support to the vehicle during travelling, thereby preventing overturning.

Typically, outriggers are operated manually or hydraulically between stored and extended positions. Hydraulically operated support assemblies, or outrigger assemblies, may either include or be connected to a hydraulic system, such as hydraulic cylinder, for effecting a movement of a corresponding support assembly. By way of example, the hydraulic system can be adapted to move the support assembly from a non-operational state to a supporting state, in which a foot of the support assembly is in contact with the ground. To this end, the support assembly provides support and stability to the working machine during an operation of the working machine, e.g. piling or filling a receiver of a truck.

Moreover, some types of support assemblies are provided with extendable legs to permit adjustability of the length of the support assemblies. One example of an extendable outrigger is disclosed in EP 1 323 871 A1, which relates to an outrigger device for working machines such as hydraulic excavators. The outrigger device comprises a supporting foot consisting of a plurality of supporting legs which are fastened to one another and extendable by a telescopic drive. The outrigger device also has a locking means for locking the supporting legs and a number of articulated gear devices for articulating the supporting legs.

Despite the activity in the field of supporting assemblies for supporting a working machine, there remains a need for improving the function of these types of supporting assemblies, sometimes denoted as outriggers, in terms of usefulness and flexibility, without compromising on the overall stability required to provide support to the vehicle during use thereof.

SUMMARY

It is an object of the present invention to provide an improved support assembly for a working machine, such as an excavator, which support assembly comprises a pivotable arranged telescopic arrangement for permitting a robust and easy-to-use adjustability of the assembly between various operational states. The object is at least partly achieved by a support assembly to claim 1.

According to a first aspect of the present invention, there is provided a support assembly for supporting a vehicle, such as a working machine. The support assembly comprises an articulated interconnecting assembly pivotable connectable to a lower part of the working machine, a telescopic arrangement connected to the articulated interconnecting assembly and comprising a guiding frame and a telescopic extension member displaceable arranged relative the guiding frame. Moreover, the support assembly comprises a foot connected to the telescopic extension member.

Further, the support assembly comprises an articulated linkage arrangement having a linkage arm and a connecting rod. The linkage arm is connectable at one end to an actuator for effecting a movement of the articulated linkage arrangement and at a second end pivotable connected to one end of the connecting rod, while the connecting rod further being pivotable connected to the telescopic extension member at a second end.

In addition, the telescopic extension member comprises a channel for accommodating a portion of the connecting rod such that the portion of the connecting rod is permitted to move along the channel of the telescopic extension member.

In this manner, the support assembly is configured to adjust a position of the foot by displacing the telescopic extension member along its axial direction, the displacement of the telescopic extension member being effected typically by a linear movement of the actuator in combination with a rotation of the articulated interconnecting assembly about the lower part.

In particular, the articulated linkage arrangement is configured to displace the telescopic extension member along its axial direction by, or upon, a rotational movement of the connecting rod, which is effected by the movement of the actuator. As such, the telescopic extension member is capable of adjusting a position of the foot in a simple and reliable manner.

By the configuration of the articulated linkage arrangement, including the linkage arm and the pivotable connected connecting rod, and the channel in the telescopic extension member, the example embodiments provide a more robust and compact support assembly. For example, the example embodiments provide a more robust support assembly in the sense that the extendable configuration of the support assembly has less movable components than other prior art systems. In addition, the example embodiments of the support assembly provide an extendable configuration with no gear wheels, gear devices or the like.

By the configuration of having at least a part of the telescopic arrangement connected to the articulated interconnecting assembly, the telescopic extension member is configured to displace relative the articulated interconnecting assembly to adjust a position of the foot, while the articulated interconnecting assembly is allowed to pivot about the lower part of the vehicle frame. That is, the telescopic extension member displaces relative the articulated interconnecting assembly to adjust a position of the base part by the movement of the linear actuator and the pivotable connected connecting rod, while the articulated interconnecting assembly is allowed to pivot about the lower part of the vehicle frame to move the foot from a non-operational state (non-supporting state) to a operational state (supporting state). As such, the support assembly is configured to move between the non-operational state (non-supporting state) to the operational state (supporting state).

Moreover, by the configuration of having at least a part of the telescopic arrangement pivotable connected articulated linkage arrangement, the displacement of the telescopic extension member and the rotational movement of articulated interconnecting assembly can be performed in an easy and smooth manner by a movement of the actuator.

To this end, the support assembly according to the example embodiments provides a smooth and easy-to-use outrigger configuration for adjusting the length (or width) of the assembly.

The example embodiments of the support assembly are particularly useful for supporting and stabilizing working machines such as excavators during various loading operations. These types of loading operations may include scooping excavation of scooping up earth and sand using a bucket, swing operation of swinging or revolving an upper swing body, dumping operation of loading earth and sand to a dump truck and a return swing operation of returning the upper swing body to a position associated with the scooping excavation. The example embodiments of the support assembly are also particularly useful for supporting and stabilizing working machines in a standstill operation, i.e. when the working machine is parked.

The support assembly according to the example embodiments is connectable to the lower frame of the working machine or to another part of a supporting system connectable to the working machine.

The support assembly is thus configured to stabilize and support the working machine. By way of example, when the working machine parks to perform its operation, the support assembly is extended sideways from the working machine by means of the telescopic arrangement and the articulated linkage arrangement, and downward against the ground to widen the vehicle's base by the combination of the articulated interconnecting assembly and the telescopic arrangement being connected to the articulated interconnecting assembly. When the operation is complete, the support assembly is returned to a non-operational state, or a stored position, so as not to impede the vehicle's travel.

The support assembly according to the various example embodiments may sometimes also be referred to a so called outrigger assembly. An outrigger is well-known term for support assemblies for various types of vehicles. Outriggers are typically a type of legs on a wheeled vehicle which are folded out when the vehicle requires stabilization, for example on an excavator or on a crane that lifts heavy loads etc.

Typically, although not strictly required, the support assembly is adapted to move between the non-operational or non-supporting state, in which the foot is oriented in the air, and an operational state, active state or supporting state, in which the foot is oriented to engage with the ground. The non-supporting state of the support assembly generally corresponds to a state of the assembly when the support assembly is in an essentially upright orientation. The supporting state of the support assembly generally corresponds to a state of the assembly when the support assembly is capable of stabilizing the vehicle, i.e. when the foot is in contact with the ground. In the supporting state of the support assembly, the articulated interconnecting assembly is generally inclined downwardly, while the telescopic extension member is in an extended state, i.e. the telescopic extension member is displaced relative the guiding frame. However, in some situations, when the ground is uneven, the support assembly can also provide stabilization by having the foot in contact with the ground when the telescopic extension member is only partly extended.

In the supporting state of the support assembly, also corresponding to the operational state (or active state), the support assembly is arranged in contact with the ground to provide a force-transmitting connection between the working machine and the ground.

Typically, the foot is configured for engaging to the ground. By way of example, the foot has a surface for contacting the ground. The foot is connected to the telescopic extension member. By way of example, the foot is pivotable connected to the telescopic extension member at a pivot point. In other words, the foot is configured to rotate about the pivot point. By way of example, the foot is pivotable connected to the telescopic extension member by a bearing or the like, which provides a means for rotating the foot about the corresponding pivot point. Thus, the pivot point typically comprises a bearing or the like.

According to one example embodiment, the linkage arm is pivotable connected to one end of the connecting rod at a pivot point. Moreover, the linkage arm is typically fixedly connected to the actuator at the one end of the linkage arm.

Typically, although strictly not necessary, the linkage arm is also connected to the articulated interconnecting assembly at the one end of the linkage arm. In this manner, the stability of the support assembly is further improved. In this manner, the linkage arm can cooperate with the support assembly during a movement of the actuator in a smoother manner.

By way of example, the telescopic extension member is displaceable arranged in an axial direction relative the guiding frame. According to one example embodiment, the telescopic extension member is displaceable arranged in the axial direction within, or at least partly within, the guiding frame.

According to one example embodiment, the telescopic extension member is a tubular member having an inner volume defined by a circumferential outer segment. In this example embodiment, the channel is disposed on a bottom part of the outer segment and extending a substantial part in the axial direction. The circumferential segment typically has an inner surface and an outer surface.

By way of example, the portion of the connecting rod is disposed in the inner volume of the extension tubular member.

However, the dimension and shape of the telescopic extension member may be different for different types of configurations and vehicle. For instance, the shape of telescopic extension member may have another type of cross sectional shape such as rectangular cross section, triangular cross section, oval cross section etc.

Also, the materials of the components making up the support assembly may be different for different types of configurations. By way of example, the components of the support assembly are made of a robust and light-weight material, such as steel, stainless steel or the like.

Typically, although strictly not required, the portion of the connecting rod is pivotable connected to the inner surface of the outer segment of the extension tubular member.

Generally, the telescopic arrangement extends in an axial direction. Thus, each one of the guiding frame and the telescopic extension member extends in the axial direction, respectively.

According to one example embodiment, the guiding frame of the telescopic arrangement is an integral part of the articulated interconnecting assembly. In this manner, it becomes possible to reduce the number of components making up the support assembly. This type of configuration may also contribute to an even better cooperation between the articulated interconnecting assembly and the telescopic arrangement during use. Also, this type of configuration may further improve the stability of the support assembly when the assembly is in its operational state, i.e. in contact with the ground. By way of example, the articulated interconnecting assembly comprising the guiding frame can be molded or casted depending on type of material and type of manufacturing method.

Alternatively, the guiding frame of the telescopic arrangement is a separate part connected to the articulated interconnecting assembly. The guiding frame can either be directly connected to the articulated interconnecting assembly or indirectly connected to the articulated interconnecting assembly via one or more additional components.

By way of example, the guiding frame is affixed to the articulated interconnecting assembly by one or more fastening members, such as a screw connection, e.g. a bolt. In addition, or alternatively, the guiding frame is affixed to the articulated interconnecting assembly by welding or the like.

According to one example embodiment, the guiding frame is an outer guiding member and the extension member is an inner tubular member. However, the dimension and shape of the guiding frame may be different for different types of configurations and vehicle. For instance, the shape of guiding frame may have another type of cross sectional shape such as rectangular cross section, triangular cross section, oval cross section etc.

The guiding frame is generally adapted to support and guide the telescopic extension member. According to one example embodiments, the guiding frame comprises a lower plate and an upper plate. Each one of the lower and upper plates is connected to the articulated interconnecting assembly. In particular, each one of the lower and upper plates is connected to an inner surface of the articulated interconnecting assembly. In other words, the guiding frame is connected to the inner surface of the articulated interconnecting assembly.

According to one example embodiment, the guiding frame is a tubular member. Thus, the guiding frame substantially circumferentially encircles the telescopic extension member. By way of example, the guiding frame is an outer tubular member and the extension member is an inner tubular member. The guiding frame can be designed in several other ways as long as the guiding frame is capable of supporting and guiding the telescopic extension member.

According to one example embodiment, the telescopic extension member is constrained to move in a linear sliding motion. Typically, the telescopic extension member is constrained to move in a linear sliding motion along the axial direction.

The support assembly may be operated manually or hydraulically between the non-operational state and the extended positions. Hydraulically operated support assemblies, may either include or be connected to a hydraulic system, such as hydraulic cylinder, for effecting a movement of the corresponding support assembly.

According to one example embodiment, the support assembly comprises the actuator operable to move the support assembly between a retracted position and an extracted position, in which the foot is permitted to engage with the ground to provide support to the vehicle. According to one example embodiment, the support assembly comprises the actuator operable to move the support assembly between an essentially upright and retracted position and an extracted position, in which the foot is permitted to engage with the ground to provide support to the vehicle. In other words, the retracted position generally corresponds to an essentially upright position of the support assembly.

By way of example, the actuator is a linear actuator. One example of linear actuator is a hydraulic actuator, e.g. a hydraulic cylinder. The hydraulic cylinder is adapted to move the support assembly from the non-operational state to the supporting state, in which a foot of the support assembly is in contact with the ground. To this end, the support assembly provides support and stability to the working machine during an operation of the working machine, e.g. piling or filling a receiver of a truck. Typically, the hydraulic actuator contains a liquid fluid.

The hydraulic actuator is typically provided as a hydraulic cylinder containing a liquid fluid. However, it is also envisioned that embodiments of the support assembly may comprise other types of hydraulic actuators. The hydraulic cylinders can, however, be replaced by any other linear actuator for moving the articulated linkage arrangement, such as an electromechanical linear actuator.

By way of example, the actuator is connected to the articulated interconnecting assembly. Typically, the actuator is connected to an upper part of the articulated interconnecting assembly. By way of example, the actuator is connected to an upper part of the articulated interconnecting assembly by a fastening member, such as a locking pin or the like.

As mentioned above, the articulated interconnecting assembly is arranged to cooperate with the actuator. For example, a rotation of the articulated interconnecting assembly about the lower pivot point is effected by a linear movement of the actuator along an actuator axial direction.

The connecting rod can be provided in several different shapes and dimension. According to one example embodiment, the connecting rod is a curved connecting rod. One advantaged with a curved connecting rod is that the cooperation between the articulated linkage arrangement and the telescopic extension member can be performed in a smooth manner, while requiring few components and minor space as the curved connecting rod is adapted to work along the channel of the telescopic extension member.

Typically, although not strictly required, the orientation of a protruding part of the curvature of the curved connecting rod correspondence with the orientation of the channel.

According to one example embodiment, the orientation of a convex curvature is a lower curvature of the curved connecting rod, while the orientation of a concave curvature is an upper curvature of the curved connecting rod. By way of example, the magnitude of the curvature of the concave upper curvature corresponds to a magnitude of a curvature of a curved outer end section of the actuator.

According to one example embodiment, the support assembly is a self-driven configuration. By way of example, the support assembly is a self-driven configuration by means of the actuator. That is, the actuator is operable to drive the support assembly.

In addition, or alternatively, the support assembly is a self-locking configuration. By way of example, the support assembly is a self-locking configuration by means of the actuator. That is, the actuator is operable to fixate the support assembly in an appropriate state such as the retracted state or the extended state. The self-locking function is generally provided by the liquid fluid contained in the actuator, as is commonly known in the type of hydraulic actuators. Typically, the support assembly is a self-driven and self-locking configuration. The actuator may be operated by a control unit.

By providing a telescopic extension member with a channel, as mentioned above, it becomes possible to adjust the support assembly from the retracted position (and generally the essentially upright orientation) to an operational state in which the foot is capable of contacting (engaging) with the ground. In addition, by the configuration of the connecting rod and the channel, the connecting rod is permitted to move along the channel of the telescopic extension member. That is, the connecting rod is permitted to move in the channel of the telescopic extension member, i.e. across a length of the channel of the telescopic extension member.

Typically, the channel is disposed on the first end part of the telescopic extension member. In particular, the channel is disposed on a bottom (or lower part) part of the telescopic extension member. Hence, the channel is disposed on the first end part of the bottom part of the telescopic extension member.

According to one example embodiment, the channel is disposed on a bottom part (or region) of the telescopic extension member. Thus, the channel has an open end corresponding with one of the axial outer ends of the telescopic extension member. The channel is further arranged between opposite arranged side parts of the telescopic extension member.

The open end of the channel is arranged at a first end of the telescopic extension member. As mentioned above, the open-ended channel is adapted to accommodate the portion of the connecting rod of the linkage arrangement. Thereby, at least a portion of the connecting rod is permitted to pass through the telescopic extension member and along the channel.

Typically, the channel extends at least partly in a length direction of the telescopic extension member to permit movement of the connecting rod upon a movement of the actuator in its axial direction.

According to one example embodiment, the support assembly is operable by a control unit. The control unit may be an integral part of the working machine or a remote control unit in communication with another sub-control unit in the vehicle.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

According to a second aspect of the present invention, there is provided a support assembly system comprising a lower part and a first support assembly and a second support assembly connected on opposite sides of a lower part of the support assembly system. Each one of the first support assembly and the second support assembly is provided according to any one of the example embodiments described above in relation to the first aspect. Accordingly, each one of the support assemblies shares one lower part. In one example, the support assembly can be directly connected to the vehicle lower frame. In this type of configuration, a pair of support assemblies is directed connected on opposite transverse sides of the vehicle lower frame. In other examples, there are four support assemblies, one for each side of the front end and the rear end of the lower vehicle frame. Hence, in a working machine such as an excavator, there are four assemblies arranged on the lower frame. That is, two assemblies in front of the lower frame and two assemblies at the rear of the lower frame. However, the number of assemblies may vary depending on type of vehicle and installation.

Effects and features of the second aspect are largely analogous to those described above in relation to the first aspect.

According to a third aspect of the present invention, there is provided a vehicle such as a working machine, e.g. an excavator, comprising a vehicle frame having a support assembly according to any one of the example embodiments described above in relation to the first aspect, the assembly being mounted to any one of a front and rear ends thereof.

Effects and features of the third aspect are largely analogous to those described above in relation to the first aspect.

According to a fourth aspect of the present invention, there is provided a vehicle such as a working machine, e.g. an excavator, comprising a vehicle frame having a support assembly system according to any one of the example embodiments described above in relation to the second aspect, the support assembly system being mounted to any one of the front and rear ends thereof.

Effects and features of the fourth aspect are largely analogous to those described above in relation to any one of the first aspect, second aspect and the third aspect.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

Figure 1:
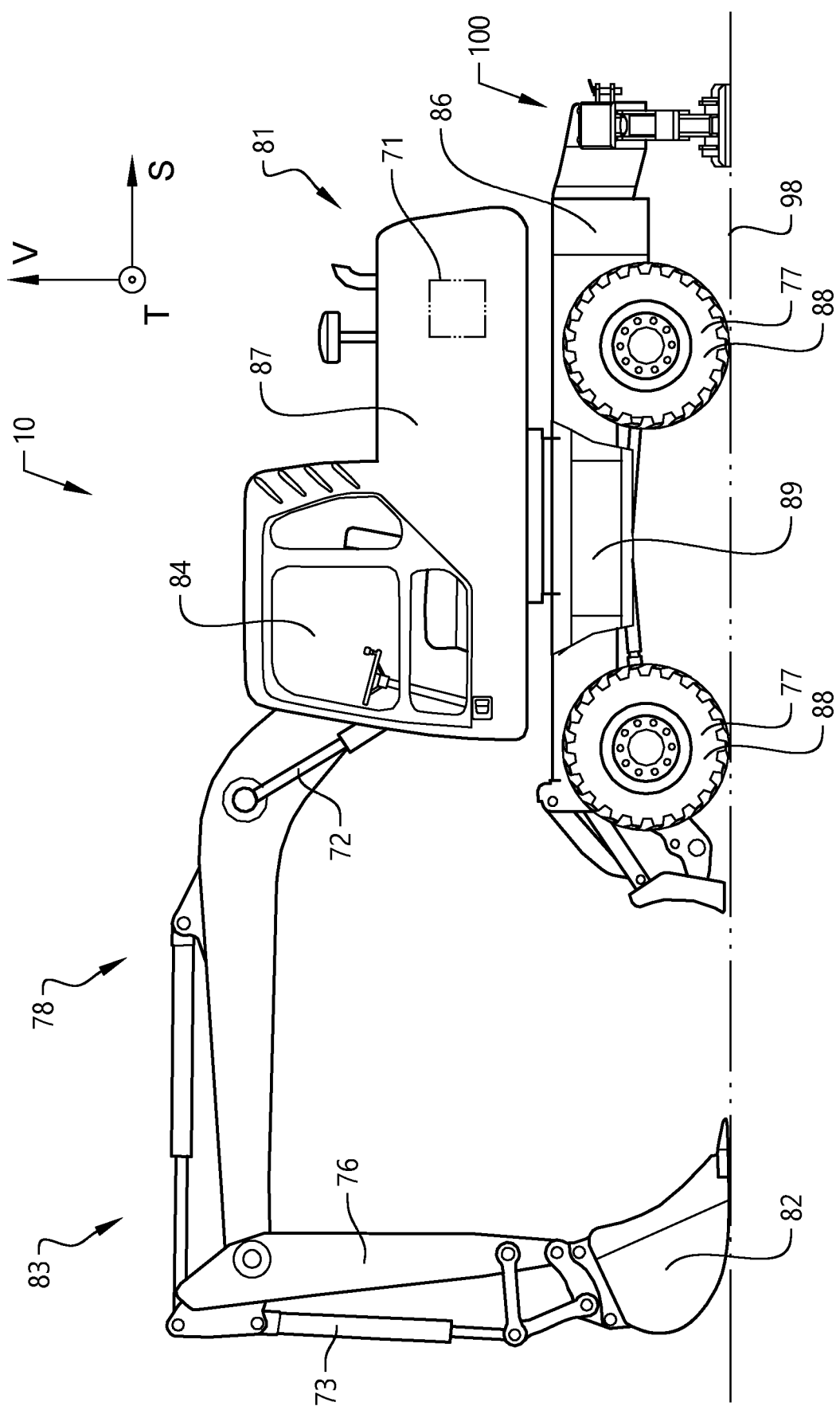
FIG. 1 is a lateral side view illustrating an example of working machine in the form of an excavator; the working machine comprising a support assembly according to one example embodiment of the present invention.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

For the sake of facilitating the understanding of some example embodiments of the invention, the example embodiments will now be described in the following for a working machine 10 in the form of an excavator such as the one illustrated in FIG. 1. The excavator 10 should be seen as an example of a working machine which could comprise a support assembly 100 according to the example embodiments of the present invention, as further described herein. However, it is to be noted that any feature and aspect of the example embodiments could be implemented in another type of working machine, such as a wheel loader, crane or the like.

Thus, while the following example embodiments of the invention are described based on an exemplary excavator, such does not mean that the invention will be limited to an installation of the support assembly in an excavator. In contrary, the vehicle may be any type of working machine intended for carrying out an operation and for utilizing the assembly 100. It should also be readily appreciated that throughout the description of the example embodiments of the present invention, the excavator may sometimes be referred to as the vehicle, the working machine or simply as the machine, or the like.

Turning now to FIG. 1, there is depicted an excavator 10 according to one example embodiment of the invention. In the example of FIG. 1, the excavator 10 is a mechanical shovel. This type of working machine comprises a lower frame 86, an upper frame 87 and a swing system 89. The lower frame, the upper frame and the swing system may form part of a main body 81 of the working machine. In addition, the lower frame may have front end 86a and a rear end 86b. That is, the working machine has a front end and a rear end.

Moreover, the working machine comprises ground engaging elements 88 for propelling the working machine. In FIG. 1, the ground engaging elements 88 comprises wheels 77. However, it is also envisioned that the ground engaging elements 88 instead of, or in addition to, wheels may comprise other means for propelling the working machine 10. As a non-limiting example, implementations of the ground engaging elements may comprise crawlers (not shown).

As mentioned above, the working machine 10 comprises the lower frame 86. In the example in FIG. 1, the lower frame is an undercarriage. The lower frame may comprise the ground engaging elements 88. Moreover, the working machine comprises the upper frame 87. In the example in FIG. 1, the upper frame 87 is a superstructure. In embodiments of the working machine, such as the excavator illustrated in FIG. 1, the upper frame 87 may be pivotable relative to the lower frame 86. As such, in this example, the working machine comprises the swing system 89 allowing the upper frame 87 to pivot in relation to the lower frame 86. The lower frame 86, the upper frame 87 and the swing system 89 form part of the main body 81 of the working machine 10.

In addition to that the working machine 10 comprises the main body 81, the working machine in this example also comprises an implement 82 and a connector 83 connecting the implement 82 to the main body 81. The excavator also has a cab 84, for accommodating an operator.

The implement 82 is movable relative to the main body 81. In FIG. 1, the connector 83 comprises a boom 78 and an arm 76. It should be noted that other working machines may comprise a connector with more or fewer components. For instance, it is envisaged that some working machines, such as a wheeled excavator, may comprise a first boom (not shown) pivotally connected to the main body, a second boom (not shown) pivotally connected to the first boom and an arm pivotally connected to the second boom. Purely by way of example, and as is indicated in FIG. 1, the implement 82 may be a bucket. The main body 81 has a vertical extension in a vertical direction V. Moreover, and as is indicated in FIG. 1, the main body 81 has an extension in a longitudinal dimension S in the intended drive direction of the working machine 10, and an extension in a transversal dimension T being perpendicular to each one of the vertical and longitudinal dimensions V, S. In other words, the working machine extends in the longitudinal direction S, the transvers direction T and in the vertical direction V.

By way of example, and as is illustrated in FIG. 1, the boom 78 may be pivotally connected to the main body 81 and may be actuated by a boom actuator 72 connected to each one of the main body 81 and the boom 78. In a similar vein, the arm 76 may be pivotally connected to the boom and may be actuated by an arm actuator 73 connected to each one of the boom and the arm. At least one, alternatively both, of the boom actuator and the arm actuator may comprise a hydraulic cylinder, such as a double acting hydraulic cylinder. Additionally, the implement may be moveable relative to the arm by means of an implement actuator, e.g. a hydraulic implement actuator. For instance, the implement 82 may be pivotable relative to the arm 76.

Furthermore, the working machine generally comprises a prime mover (not shown), such as an internal combustion engine, and a gearbox (not shown) having a transmission arrangement configured to obtain a set of gears. These parts of the working machines are well-known and can be provided in several different ways depending on type of working machine and type of driving condition. As these parts of the working machine are well-known components, they will not be further described herein.

Furthermore, the working machine 10 in this example comprises a control unit 71. The control unit 71 is adapted to control some of the components in the machine, and the interaction between the components, e.g. the control unit may be configured to control the gearbox or any other part of the working machine. In some examples, the control unit may comprise one or more sub-control units in communication with each other. In other words, the control unit 71 may be, or form part of, already existing control units for controlling the machine or parts of the machine. The control unit is typically also adapted to control various working machine operations and/or to process data relevant for the operation of the working machine. The control unit is typically configured to control the support assembly 100, as described further herein.

A working machine 10 may be used for a plurality of assignments. One type of assignment may be to dump material into a receiver. In this type of operation, the working machine is typically stabilized by one or more support assemblies 100, also herein sometimes denoted as outrigger assemblies.

As mentioned above, and as illustrated in FIG. 1, the working machine 10 comprises the support assembly 100 according to an example embodiment of the present invention. The assembly 100 is described in further details with reference to FIGS. 2a-2d, 3a-3c, 4a-4f, and 5a-5d.

Figure 2A:
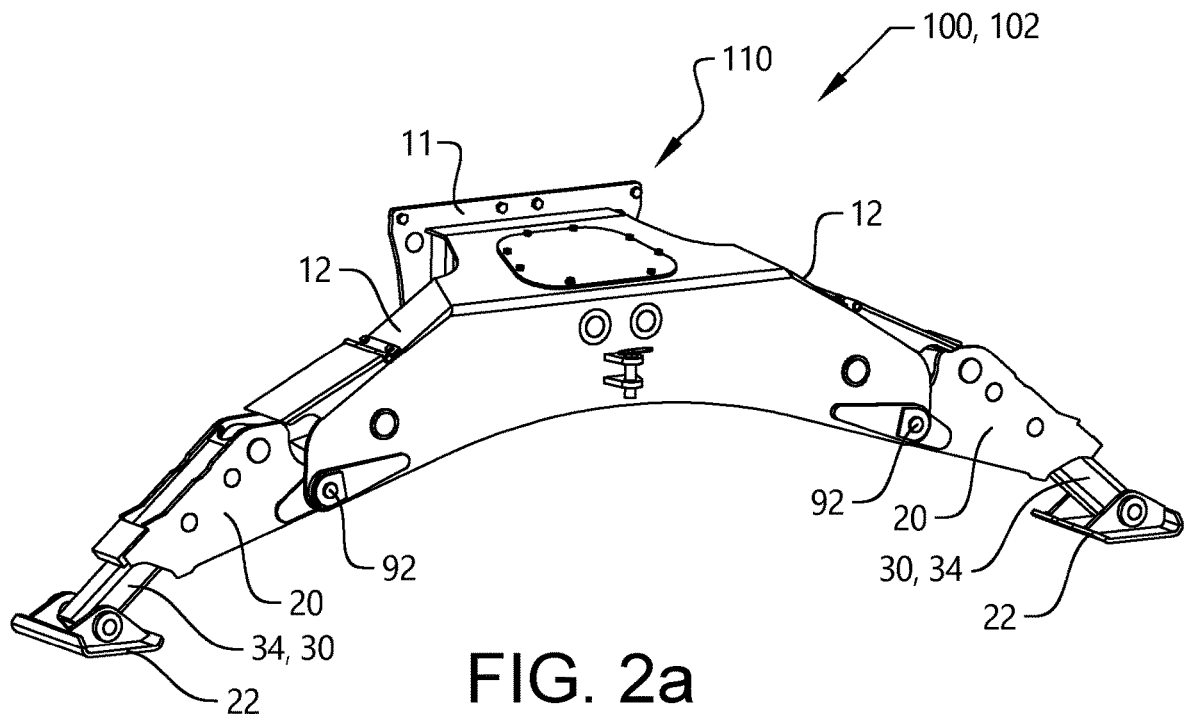
FIGS. 2a-2b schematically illustrate parts of an example embodiment of a support assembly, in particular a support assembly system comprising a first support assembly and a second support assembly, connectable to lower frame of a working machine in FIG. 1, thereby forming an assembly and system for supporting the working machine according to the present invention.
Figure 2B:
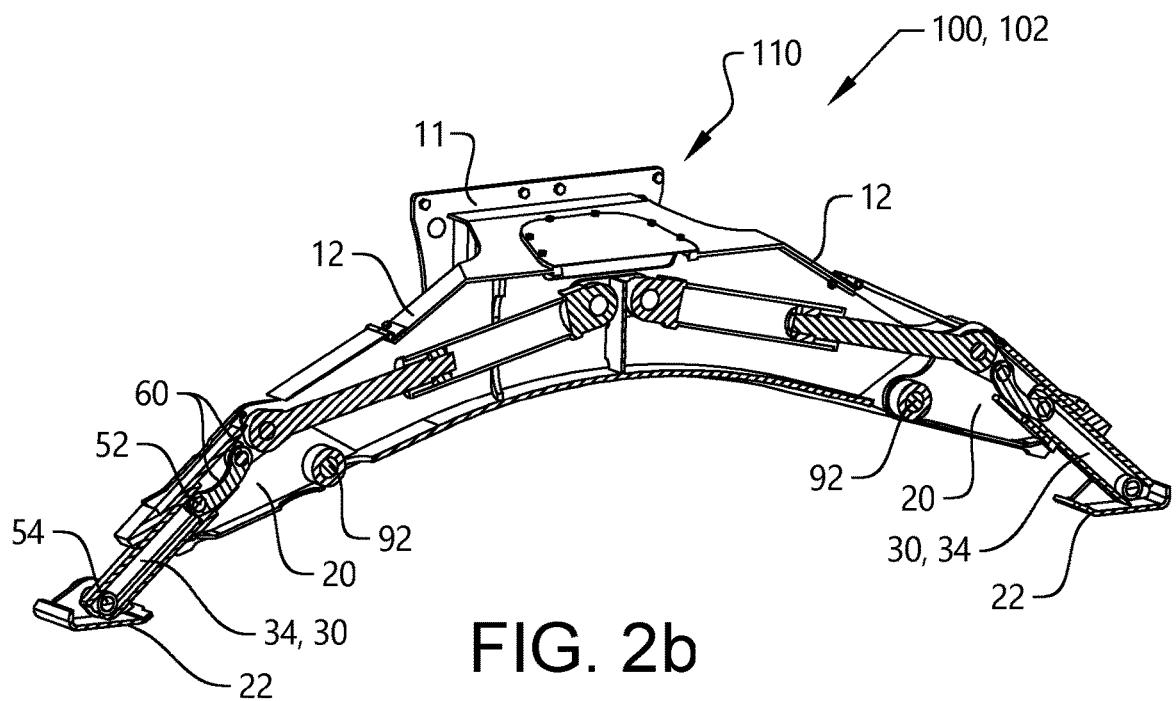

Now with reference to FIGS. 2a and 2b, an example embodiment of a support assembly according to the present invention is illustrated. The support assembly 100 is intended for supporting a vehicle, such as the excavator (working machine) in FIG. 1. In particular, the support assembly is intended for providing support to the excavator during an operation such as digging, piling etc. The support assembly can support and stabilize the working machine in a parked operation, or any other similar operation in which the working machine may need support.

Figure 3A:
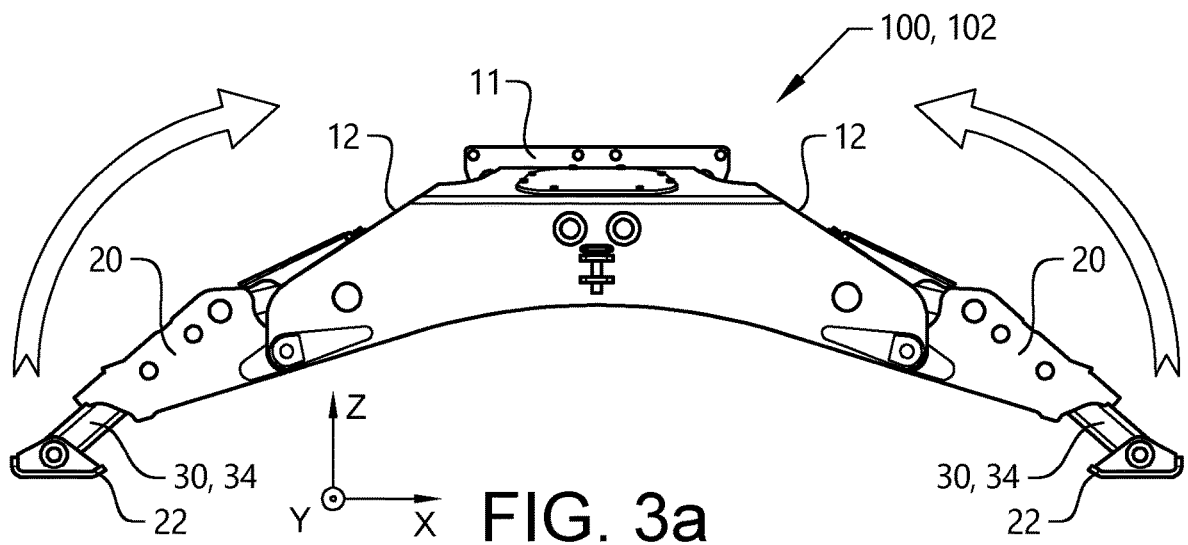
FIGS. 3a-3c are schematic perspective views of an example embodiment of the support assembly according to the present invention, in which FIG. 3a schematically illustrates the support assembly in an extracted position, sometimes also denoted as the operational state or the operational position of the support assembly, FIG. 3b schematically illustrates an intermediate position of the support assembly, while FIG. 3c schematically illustrates the support assembly in an essentially upright and retracted position.
Figure 3B:
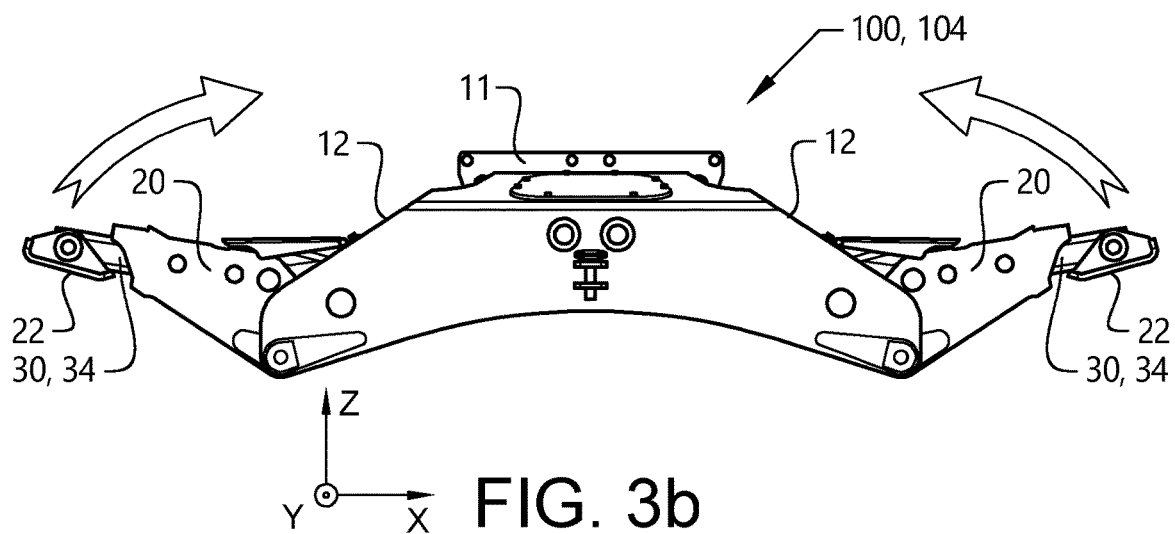
Figure 3C:
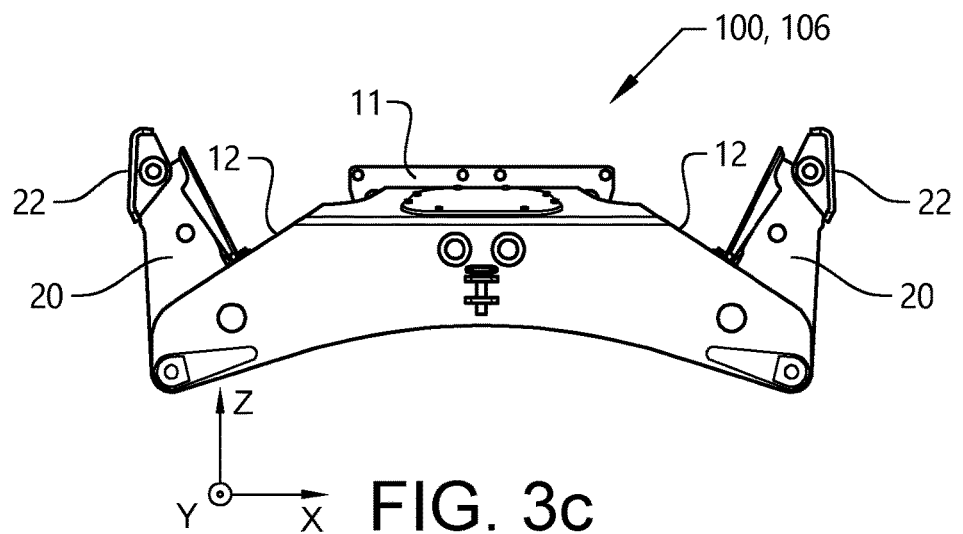

As illustrated in e.g. FIGS. 3a to 3c, the support assembly 100 typically extends in a longitudinal (length) direction X, a transverse (width) direction Y and in a vertical (height) direction Z. As shown in the figures, the directions forms a conventional coordinate system, i.e. the three coordinate axes are given, each perpendicular to the other two at the origin, the point at which they cross. In other words, the longitudinal direction is perpendicular to the transverse direction. Analogously, the longitudinal direction is perpendicular to the vertical direction. Analogously, the vertical direction is perpendicular to the transverse direction. Also, it is to be noted that when support assembly is arranged to a working machine such as illustrated in the FIG. 1, the working machine longitudinal direction S corresponds to the support assembly transverse (width) direction Y, the working machine transverse direction T corresponds to the support assembly longitudinal (length) direction X, and the working machine the vertical direction V corresponds to the support assembly vertical (height) direction Z.

It should be noted that the terms top, above, upper, upward, below, lower, base, downward and bottom, as well as any other similar terms are used in reference to the position of the assembly 100 as depicted in the drawings, e.g. FIGS. 1 and 2a, and the support assembly may be positioned and used in other orientations. In addition, the term side, or laterally and other similar terms refers to the direction parallel to the transverse direction Y of the assembly 100.

As depicted in FIGS. 2a and 2b, there is illustrated an example embodiment of the support assembly 100 for supporting the working machine 1. FIG. 2a is schematic perspective view of the support assembly 100, while FIG. 2b is a schematic cross-sectional perspective view of the support assembly in FIG. 2a. The support assembly comprises an articulated interconnecting assembly 20 pivotable connectable to a lower part 12 of the working machine. As illustrated in FIG. 2b, the articulated interconnecting assembly is generally a hollow part having an inner volume.

The articulated interconnecting assembly 20 is in this example pivotable connected to the lower part 12 of the working machine at a lower pivot point 92. In this manner, the articulated interconnecting assembly 20 is configured to rotate about the lower pivot point. By way of example, the articulated interconnecting assembly 20 is pivotable connected to the lower part 12 by a bearing (not shown) or like, providing means for rotating the assembly 20 about the pivot point 92. Thus the lower pivot point 92 typically comprises a bearing or the like.

The lower part 12 is in this example a part pf the support assembly 100. The lower part 12 is connected to the lower frame 86 of the vehicle 10 (see FIG. 1). By way of example, the lower part is connected to the lower frame 86 of the vehicle by an attachment 11, such as a bolted attachment plate. Other attachment solutions are also conceivable depending on type of vehicle and type of installation. It is also be to be noted that the lower part 12 can be an integral part of the lower frame 86 of the vehicle. Thus, in some design variants, the articulated interconnecting assembly 20 is pivotable connected to the vehicle lower part of the working machine at the lower pivot point 92. To this end, the articulated interconnecting assembly 20 can be pivotable connectable to the lower part or the vehicle lower frame in several different manners.

Moreover, the support assembly can be mounted to any one of a front end of the vehicle and a rear end of the vehicle. The example embodiments of the support assembly 100 as described in relation to the Figures, e.g. shown in FIG. 1, are mounted to the rear end of the vehicle lower frame of the working machine 10.

Typically, although not strictly required, there are a set of two support assemblies in one support system 110, as illustrated in FIGS. 2a and 2b. That is, there is one support assembly 100 connected on each side of the lower part 12 of the support assembly system 110. Accordingly, each one of the support assemblies shares one lower part 12. Accordingly, each one of the support assemblies are connected to one common lower part 12. The common lower part 12 is then connected to the vehicle lower frame 86 (see FIG. 1). In one design variant, the support assembly 100 can be directly connected to the vehicle lower frame 86. In this type of configuration, a pair of support assemblies is directly connected on opposite transverse sides of the vehicle lower frame 86 (see FIG. 1). In other design variants, there are four support assemblies 100, one for each side of the front end and the rear end of the lower vehicle frame. Hence, in a working machine such as an excavator, there are four assemblies 100 arranged on the lower frame 86. That is, two assemblies 100 in front of the lower frame and two assemblies 100 at the rear of the lower frame. However, the number of assemblies 100 may vary depending on type of vehicle and installation. FIG. 2a shows an example embodiment of a support assembly system in which a first support assembly and a second support assembly are connected to opposite side edges of a lower part 12 configured to connect to a vehicle lower frame.

Turning again to FIGS. 2a and 2b, the support assembly 100 also comprises a telescopic arrangement 30. The telescopic arrangement 30 is configured to permit the support assembly to extend its length (or width) in order to provide a better stability and support during use thereof. The telescopic arrangement 30 is connected to the articulated interconnecting assembly 20, as is further described below.

Figure 2C:
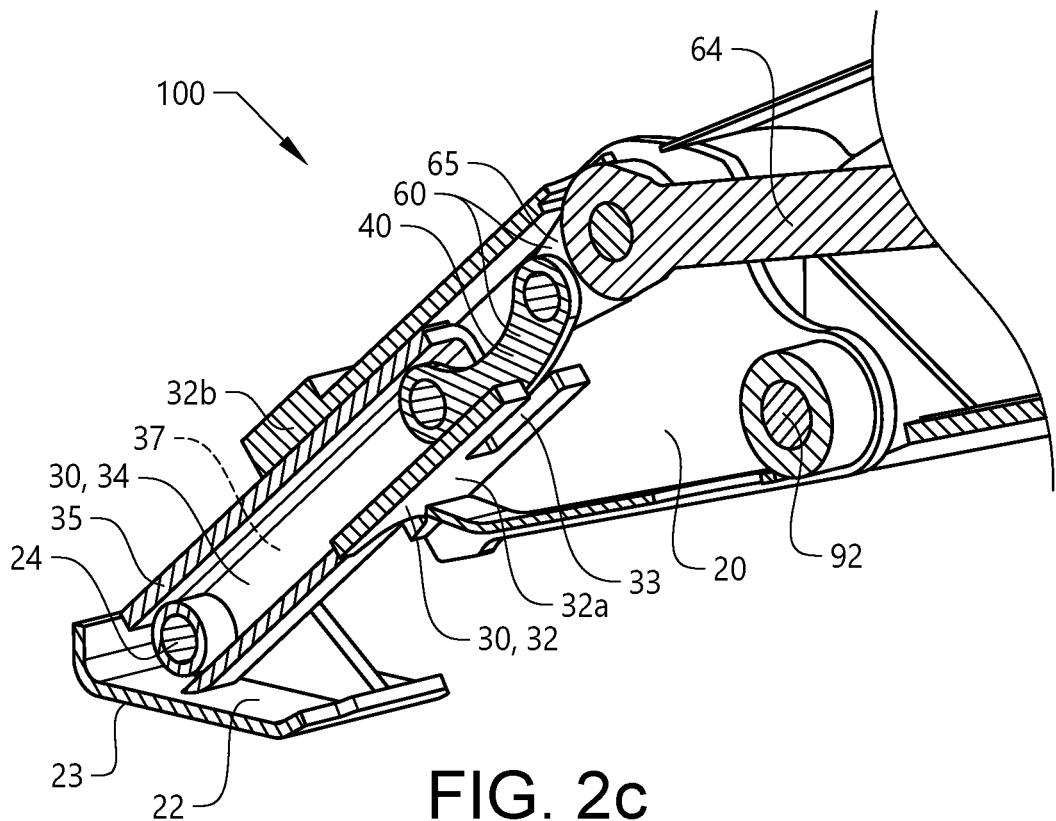
FIGS. 2c-2d are schematic cross-sectional perspective views of an example embodiment of the support assembly according to the present invention, in which the support assembly comprises an articulated interconnecting assembly and a guiding frame.
Figure 2D:
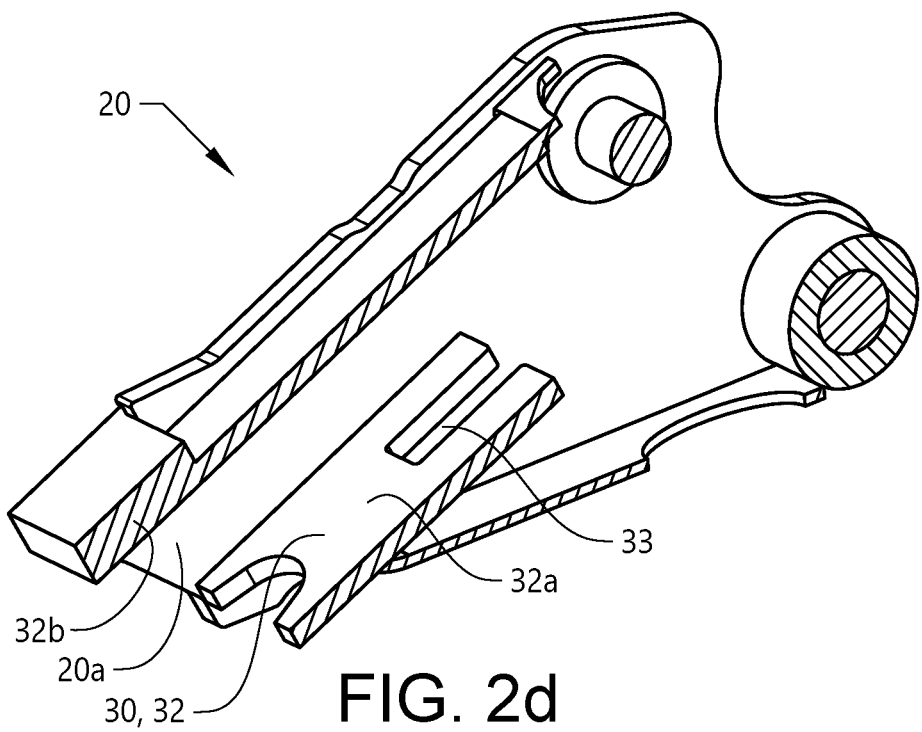

Moreover, as illustrated in e.g. FIG. 2c, the telescopic arrangement 30 comprises a guiding frame 32 and a telescopic extension member 34. The telescopic arrangement 30 extends in an axial direction A1, see e.g. FIG. 4a. Thus, each one of the guiding frame 32 and the telescopic extension member 34 extends in the axial direction A1, respectively. One example embodiment of the guiding frame 32 is further illustrated in FIGS. 2c and 2d. FIG. 2c is a cross-sectional perspective view of an example embodiment of the support assembly, while FIG. 2d is a cross-sectional perspective view of the articulated interconnecting assembly and the guiding frame according to one example embodiment. The guiding frame 32 is in this example embodiment an axially extending member connected to the articulated interconnecting assembly 20. In particular, as shown in FIGS. 2c and 2d, the guiding frame 32 of the telescopic arrangement 30 is an integral part of the articulated interconnecting assembly. Moreover, as may be gleaned from FIGS. 2c and 2d, the guiding frame 32 comprises a lower plate 32a and an upper plate 32b. Each one of the lower and upper plates is connected to the articulated interconnecting assembly 20. In particular, each one of the lower and upper plates is connected to an inner surface 20a of the articulated interconnecting assembly 20. In other words, the guiding frame 32 is connected to the inner surface of the articulated interconnecting assembly 20.

By this configuration, the guiding frame 32 is adapted to support and guide the telescopic extension member 34, as is e.g. illustrated in FIGS. 2b and 2c, and which is also further described below. The telescopic extension member 34 is further displaceable arranged in the axial direction A1 relative the guiding frame 32. By way of example, the telescopic extension member 34 is movable relative the guiding frame in a slidable manner, as a conventional telescopic arrangement. Further, in one design variant, the telescopic extension member can be displaceable arranged in the axial direction within the guiding frame.

The guiding frame also comprises a recess 33, which will be further described below. It is to be noted that the guiding frame may be designed in other ways. In addition, the guiding frame may be connected to the articulated interconnecting assembly 20 in several different ways.

Also, as should be readily appreciated from the Figures, e.g. FIGS. 2a-2d, the articulated interconnecting assembly 20 optionally provides further support to the telescopic arrangement 30, in particular the telescopic extension member 34. As can be seen in FIGS. 2a-2d, side walls 20b and 20c of the articulated interconnecting assembly 20 (see FIG. 4e) further contributes that the telescopic extension member 34 is fixed in a lateral direction (typically corresponding to the transverse direction Y of the support assembly).

In one design variant, the guiding frame is a tubular member. Thus, the guiding frame circumferentially encircles the telescopic extension member. By way of example, the guiding frame is an outer tubular member and the extension member is an inner tubular member.

Figure 5A:
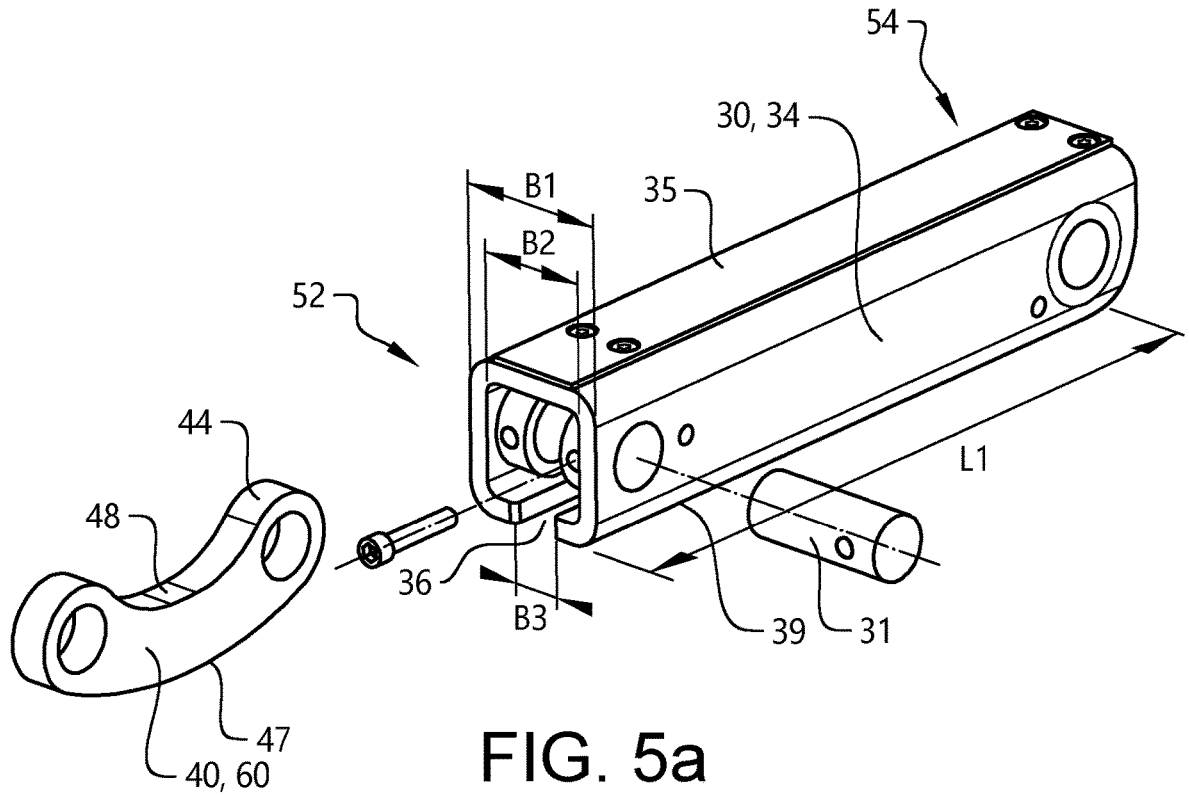
FIGS. 5a-5c are schematic perspective views of an example embodiment of a connecting rod pivotable connected to a telescopic extension member of the support assembly according to the present invention.
Figure 5B:
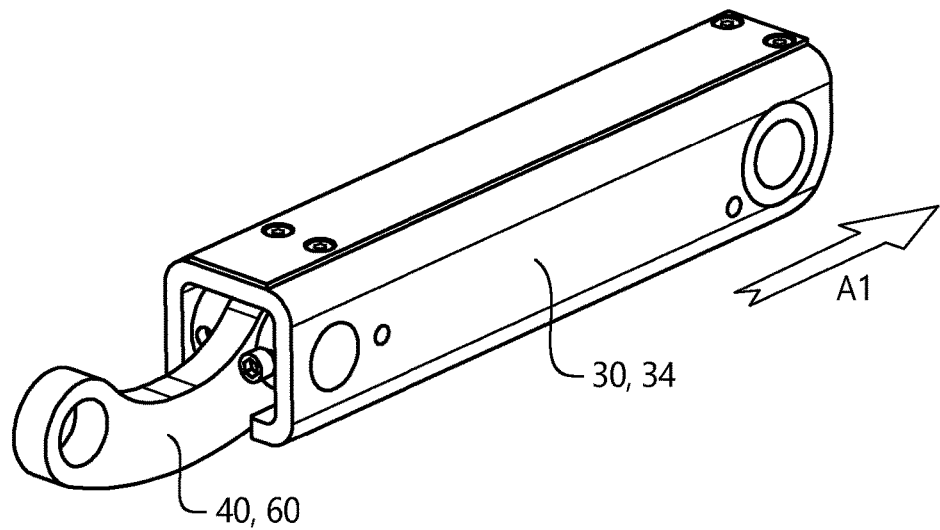
Figure 5C:
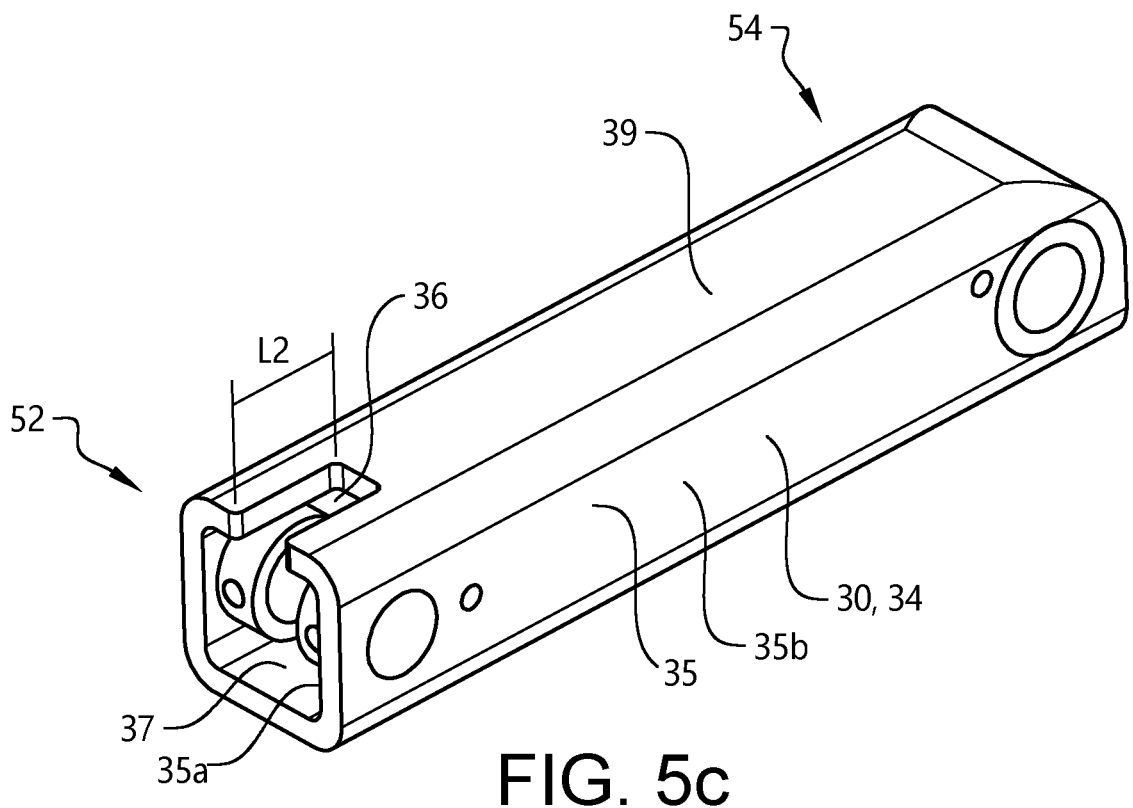
Figure 5D:
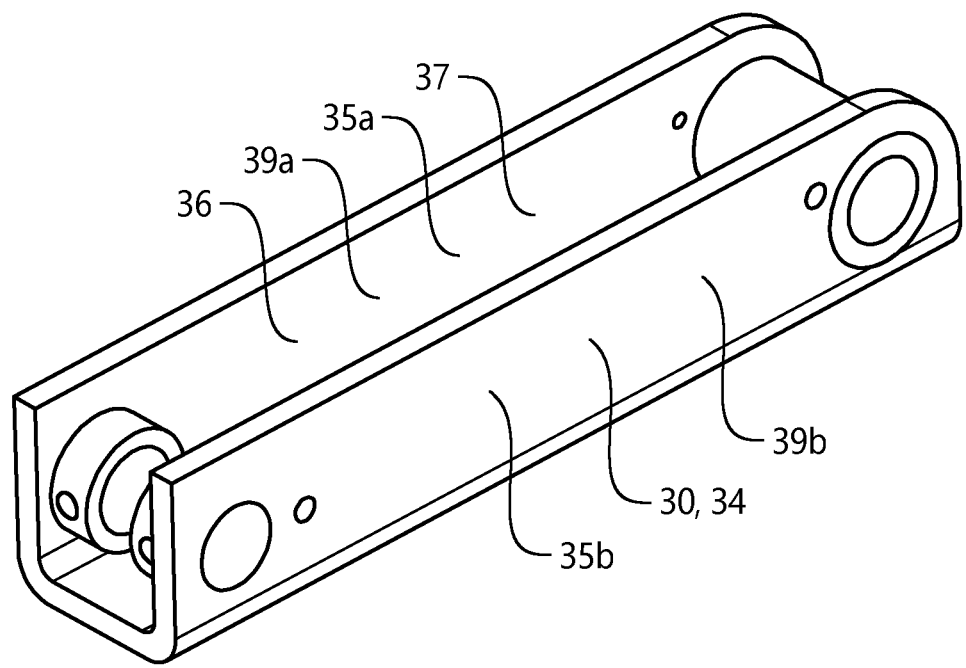
FIG. 5d is a schematic perspective view of another example embodiment of a telescopic extension member of the support assembly according to the present invention.

Referring again to FIGS. 2a-2c, and in particular FIG. 2c, there is illustrated a cross-sectional perspective view of the telescopic extension member 34. As mentioned above, the telescopic extension member 34 is displaceable arranged in the axial direction A1 relative the guiding frame 32, i.e. the telescopic extension member is displaceable arranged in the axial direction at least partly within the guiding frame. Also, by the configuration of the guiding frame and the articulated interconnecting assembly 20, as mentioned above, the telescopic extension member is constrained to move only in a linear sliding motion, typically in a linear sliding motion along the axial direction A1. The telescopic extension member also comprises a channel 36 (see e.g. FIG. 5a), which will be further described below. Typically, the telescopic extension member is an essentially tubular shaped member. The telescopic extension member 34 thus has an inner volume 37 defined by a circumferential outer segment 35 having an inner surface 35a and an outer surface 35b (see FIGS. 5a and 5c). One example embodiment of a telescopic extension member in the form of an essentially tubular shaped member is illustrated in FIG. 5c. Another example of a conceivable shape of a telescopic extension member is illustrated in FIG. 5d. In FIG. 5d, the shape of the telescopic extension member 34 resembles a U-beam. That is, the telescopic extension member 34 has a U-shaped cross-section.

Turning again to FIGS. 2a to 2c, there is also illustrated a foot 22, sometimes also denoted a base part. Accordingly, the support assembly 100 comprises the foot 22 connected to the telescopic extension member 34. The foot is configured to engaging with the ground 98. In this manner, the support assembly is capable of providing stability and support to the working machine because forces generated from the load of the working machine can be transmitted to the ground via through the components of the support assembly and the contact between the foot and the ground 98, see e.g. FIG. 1. Typically, the foot has a ground engaging surface 23 of a suitable extension and material, as is commonly known in the art.

Optional, the foot 22 is pivotable connected to the telescopic extension member 34. By way of example, the foot 22 is pivotable connected to the telescopic extension member 34 at a pivot point 24. In addition, the foot 22 may be configured to be selectively locked in a number of foot supporting positions. Alternatively, or in addition, the foot 22 may be configured to be freely adjustable in a number of foot supporting positions. In the latter configuration, the foot 22 is set in a certain supporting position by being in contact with the ground. In other words, the foot is configured to rotate about the pivot point 24. By way of example, the foot is pivotable connected to the telescopic extension member by a bearing (not shown) or like, which provides means for rotating the foot about the corresponding pivot point. Thus, the pivot point 24 typically comprises a bearing or the like.

The foot 22 may likewise be fixedly connected to the telescopic extension member 34.

In general, the foot 22 is connected to the telescopic extension member 34 at bottom part of the telescopic extension member, i.e. at an end part 54 (see FIG. 2b). Thus, the telescopic extension member 34 has a first end part 52 and a second end part 54. The first end part 52 is opposite arranged the second end part 54. In particular, the first end part 52 is opposite arranged the second end part 54, as seen in the axial direction A1. The end parts 52, 54 of the telescopic extension member 34 are e.g. illustrated in FIGS. 2b and 2c, or in FIGS. 5a and 5c.

To this end, the foot can be arranged in several different manners as long as the foot 22 is configured to engage to the ground 98, while being connected to the telescopic extension member 34.

In addition, the support assembly 100 further comprises an articulated linkage arrangement 60 having a linkage arm 65 and a connecting rod 40. One example of an articulated linkage arrangement 60 is illustrated in FIGS. 2b and 2c, and further in FIGS. 4a to 4d. The linkage arm 65 has a first end 94 and a second end 96 (see FIG. 4e). The first end 94 is typically arranged opposite the second end 96. By way of example, the first end 94 is typically arranged axially opposite the second end 96 (as seen in an axial direction of the linkage arm).

The linkage arm 65 is connected at the one end 94 to a linear actuator 64 for effecting a movement of the articulated linkage arrangement. In particular, the linkage arm 65 is fixedly connected to the actuator 64 at the one end 94. The linear actuator is further described below. The linkage arm 65, and its connection with the linear actuator 64, is shown in e.g. FIGS. 4a to 4d. In this example embodiment, the linkage arm 65 is provided in the form of a shaped plate welded to the actuator 64. However, the linkage arm 65 can likewise be provided in the form of a shaped plate with a hole at the one end 94 adapted to connect to the actuator 64 by means of e.g. a locking pin (not shown) or the like.

Typically, although strictly not necessary, the linkage arm 65 is also connected to the articulated interconnecting assembly 20 at the one end 94. In this manner, the stability of the support assembly is further improved. In this manner, the linkage arm 65 can cooperate with the assembly 20 during a movement of the actuator, as further described herein.

Also, the linkage arm 65 is pivotable connected at the second end 96 to one end 42 of the connecting rod 40. The connecting rod 40 thus has a first end 42 and a second end 44. The first end 42 is typically arranged opposite the second end 44. By way of example, the first end 42 is arranged axially opposite the second end 44 (as seen in an axial direction of the linkage arm). Moreover, as illustrated in e.g. FIGS. 4a to 4d, the connecting rod 40 is a curved connecting rod. The curved connecting rod has convex curvature 47 and a concave curvature 48, as illustrated in e.g. FIG. 5a. Typically, the orientation of the convex curvature 47 is the lower curvature of the curved connecting rod, while the orientation of the concave curvature 48 is the upper curvature of the curved connecting rod. By way of example, the magnitude of the curvature of the concave upper curvature corresponds to a magnitude of a curvature of a curved outer end section of the actuator, as illustrated in e.g. FIG. 4c.

Similar to the pivotable connections mentioned above, the linkage arm 65 is pivotable connected to the connecting rod 40 at a pivot point. The pivot point is generally located to the first end 42 of the connecting rod 40. In other words, the connecting rod is configured to rotate about the pivot point. By way of example, the connecting rod 40 is pivotable connected to the linkage arm 65 by a bearing (not shown) or the like, which provides a means for rotating the connecting rod about the corresponding pivot point. Thus, the pivot point typically comprises a bearing or the like.

Moreover, the connecting rod 40 is further pivotable connected to the telescopic extension member 34. In particular, the connecting rod 40 is pivotable connected to the telescopic extension member 34 at the second end 44 (of the connecting rod 40). As the second end 44 is typically arranged opposite the first end 42, the telescopic extension member 34 is connected to the connecting rod 40 opposite the actuator 64, which is connected to the connecting rod at the first end 42 of the connecting rod.

As can be seen in e.g. FIG. 2b, the second end 44 of the connecting rod 40 is connected to the first end part 52 of the telescopic extension member 34.

Similar to the pivotable connections mentioned above, the connecting rod 40 is pivotable connected to the telescopic extension member 34 at a pivot point. In other words, the connecting rod is configured to rotate about the pivot point. By way of example, the connecting rod 40 is pivotable connected to the telescopic extension member 34 by a bearing (not shown) or the like, which provides a means for rotating the connecting rod about the corresponding pivot point. Thus, the pivot point typically comprises a bearing or the like. One example of connecting the connecting rod 40 to the telescopic extension member 34 is shown in FIGS. 5a and 5b. As can be noted from FIGS. 5a and 5b, the telescopic extension member 34 includes a locking pin 31. The locking pin 31 is insertable in a hole of the telescopic extension member 34 and through a corresponding hole of the connecting rod 40 so as to form a pivotable locking configuration, which is illustrated in FIG. 5b. A similar locking configuration can be provided in the other pivotable connections described herein.

Thus, while the connecting rod is pivotable connected to the telescopic extension member 34, the telescopic extension member 34, on the other hand, is configured to move in the axial direction A1 (linearly) as the telescopic extension member 34 is arranged in a telescopic arrangement with the guiding frame 32, as mentioned above, and which also is readily appreciated from the FIGS. 3a to 3c and FIGS. 4a to 4c.

Figure 4A:
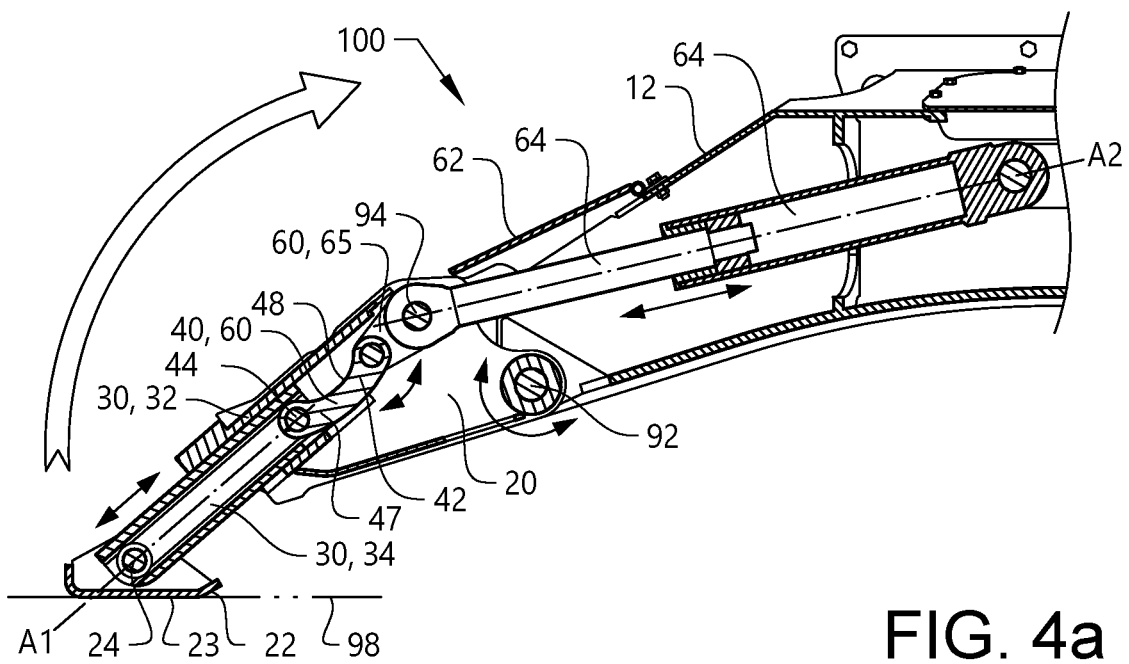
FIGS. 4a-4c are schematic cross-sectional perspective views of an example embodiment of the support assembly according to the present invention, in which FIG. 4a schematically illustrate the support assembly in an extracted position, sometimes also denoted as the operational state or the operational position of the support assembly, FIG. 4b schematically illustrates an intermediate position of the support assembly, while FIG. 4c schematically illustrates the support assembly in an essentially upright and retracted position.
Figure 4B:
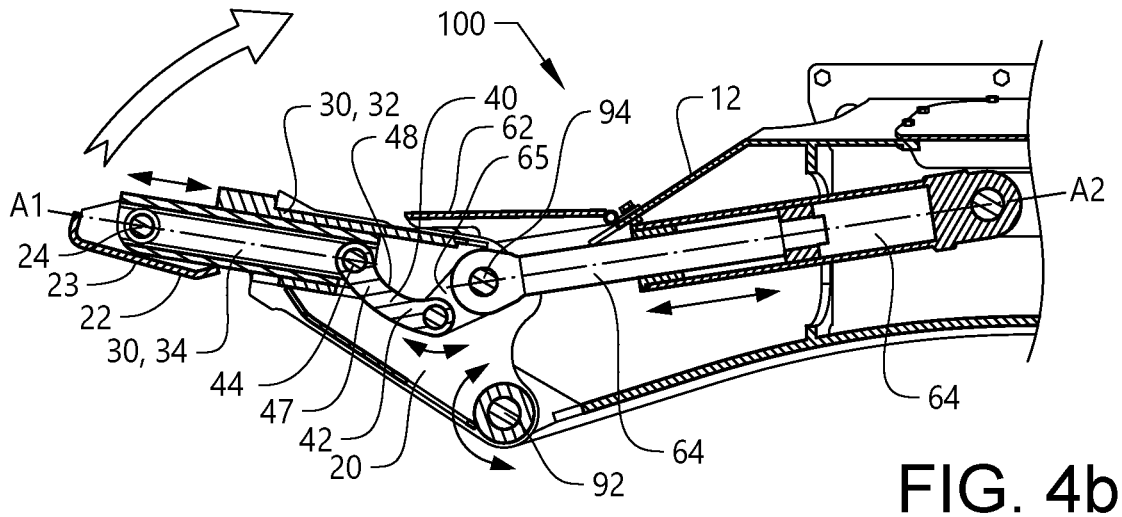
Figure 4C:
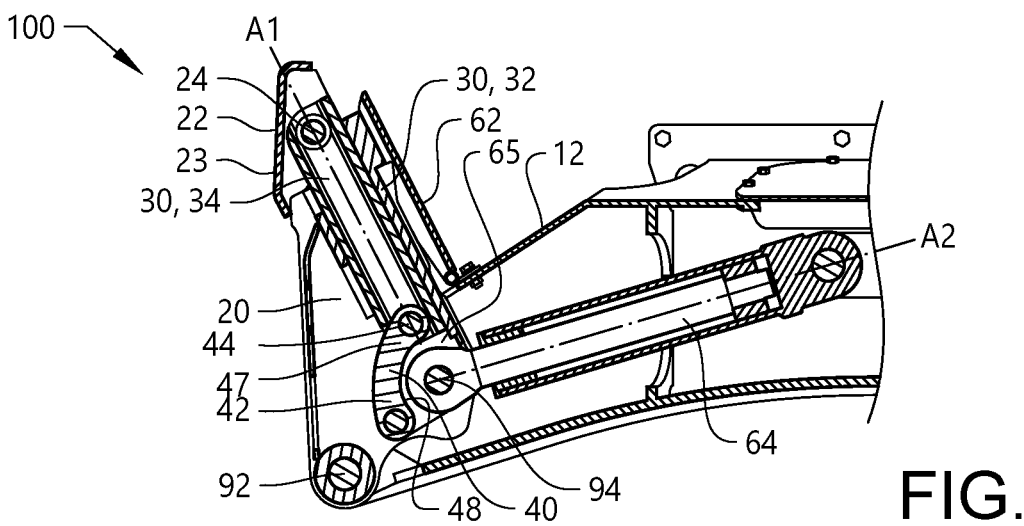

Turning now again to the connecting rod 40, and FIG. 2c and FIGS. 5a-5c, it is illustrated that the connecting rod 40 is pivotable connected to the telescopic extension member 34 at the second end 44. In addition, the telescopic extension member 34 comprises a channel 36. The channel 36 is configured to accommodate a portion of the connecting rod 40 such that the portion of the connecting rod 40 is permitted to move along the channel of the telescopic extension member. In this manner, it becomes possible to adjust the support assembly from an essentially upright orientation, as illustrated in FIG. 4c, to an operational state in which the foot 22 is capable of contacting (engaging) with the ground 98, as illustrated in FIG. 4a. Also, the FIGS. 4a to 4c illustrate how the connecting rod 40 is permitted to move along the channel 36 of the telescopic extension member. In this context of the example embodiments, FIG. 4b illustrates an intermediate position of the support assembly 100, i.e. a position of the support assembly in-between the essentially upright orientation (FIG. 4c) and the operational position (FIG. 4a).

In an example embodiment when the guiding frame is provided with the recess 33, the recess 33 is also configured to accommodate a portion of the connecting rod 40 such that the portion of the connecting rod 40 is permitted to move along the recess of the guiding frame. However, as the guiding frame can be designed in several different ways to guide the telescopic extension member, the recess 33 is only optional, and not strictly necessary.

Referring again to FIGS. 5a to 5c, the channel 36 is disposed on the first end part 52 of the telescopic extension member 34. In particular, the channel 36 is disposed on a bottom (or lower part) part 39 of the telescopic extension member 34. In other words, the orientation of the channel 36 essentially corresponds with an orientation of a lower part of the curved connecting rod 40. That is, the orientation of a protruding part 47 of the curvature of the curved connecting rod 40 correspondence with the orientation of the channel 36.

Moreover, the channel 36 extends at least a substantial part in the axial direction A1 of the telescopic extension member 34.

By way of example, the telescopic extension member is an essentially tubular shaped member, as mentioned above, and which is illustrated in FIG. 5c. Thus, as shown in FIG. 5c, the telescopic extension member 34 has the inner volume 37 defined by the circumferential outer segment 35. The circumferential outer segment 35 has the inner surface 35a and the outer surface 35b.

Another example of a conceivable shape of a telescopic extension member is illustrated in FIG. 5d. In FIG. 5d, the shape of the telescopic extension member 34 resembles a U-beam. That is, the telescopic extension member 34 has a U-shaped cross-section.

In other words, in an example when the telescopic extension member 34 is a tubular member having an inner volume 37 defined by the circumferential outer segment 35, the channel 36 is disposed on the bottom part 39 of the outer segment 35 and extending a substantial part in the axial direction A1.

Moreover, in an assembled state of the connecting rod and the telescopic extension member 34, at least a part of the connecting rod 40 is disposed in the inner volume of the telescopic extension member 34. As illustrated in e.g. FIG. 5b, the second end 44 of the connecting rod (see also FIG. 5a) is disposed in the inner volume 37 of the extension tubular member 34. As may gleaned from FIGS. 5a to 5c, the second end part 44 of the connecting rod 40 is pivotable connected to the inner surface 35a of the outer segment 35 of the extension tubular member.

By the configuration of the connecting rod 40, the telescopic extension member 34 having the recess 36, a portion of the connecting rod 40 is capable of moving along the longitudinal extension of the channel 36 of the telescopic extension member 34. That is, a portion of the connecting rod 40 is capable of moving along the longitudinal extension of the channel 36 of the telescopic extension member 34 upon a movement of the actuator, which effects a rotational movement of the connecting rod.

As depicted in e.g. FIGS. 5a and 5c, the recess 36 has an open end at the second end 52 of the telescopic extension member. The recess 36 is adapted to accommodate a part of the connecting rod as mentioned above. That is, the recess 36 is configured to accommodate a part of the connecting rod when the support assembly is adjusted between the various states, e.g. in the operational state. Accordingly, the recess 36 is typically adapted to receive the part of the connecting rod when the actuator is moved in the axial direction A2 to effect a pivotable rotation of the connecting rod about the pivot point at the end 52 of the telescopic extension member 34, which are schematically illustrated by the FIGS. 3a to 3c and FIGS. 4a to 4c. As illustrated in the FIGS. 5a and 5c, the recess extends at least partly in a length direction L of the telescopic extension member 34. In addition, the recess typically also has an extension in the transverse direction B of the telescopic extension member 34. That is, the telescopic extension member 34 has length L1 and a transverse width B1, while the recess has a length L2 and a transverse width B3. Moreover, the circumferential segment has a thickness (B1 minus B2). Further, the inner volume of the telescopic extension member has an inner transverse width B2. As noted from the FIGS. 5a and 5c. The recess length L2 is less than the telescopic extension member length L1. Also, the recess transverse width B3 is less than the telescopic extension member inner transverse width B2.

As mentioned above, the channel 36 can be designed in several different ways. One example of a recess 36 is illustrated in FIGS. 5a to 5c. Another example of a recess 36 is illustrated in FIG. 5d. In FIG. 5d, the shape of the telescopic extension member 34 resembles a U-beam. That is, the telescopic extension member 34 has a U-shaped cross-section. In this type of the telescopic extension member, the recess is at least partly defined by the opposite arranged side walls 39a and 39b. The example as depicted in FIG. 5d may include any other feature, aspect or function as described in relation to the example embodiment as described above in relation to FIGS. 5a-5c, as long as there is no contradiction between the features of the two examples. The example in FIG. 5d may be installed in the support assembly 100 as described in relation to the other Figures, and as mentioned above.

Turning now to the actuator 64, as illustrated in e.g. FIG. 2c and also in FIGS. 4a to 4c, it is to be noted that this part may either be a part of the support assembly 100 or a part of the working machine. In the example embodiment described in relation to the Figures, in particular in relation to the e.g. FIG. 2b and FIGS. 4a to 4c, the support assembly 100 comprises the actuator 64. The actuator 64 is operable to move the support assembly 100 between an essentially upright and retracted position and an extracted position, in which the foot is permitted to engage with the ground to provide support to the vehicle. The essentially upright and retracted position 106 of the support assembly 100 is illustrated in FIG. 3c, and also in FIG. 4c. The extracted position 102 of the support assembly 100, sometimes also denoted as the operation state, operational position etc., is illustrated in FIG. 3a, and also in FIG. 4a. FIG. 3b, and also FIG. 4b, illustrates an intermediate position 104 of the support assembly 100, in which the telescopic extension member is partly extracted.

As mentioned above, the actuator is typically fixedly connected to an upper part of the articulated interconnecting assembly. In this manner, a movement of the actuator in its axial direction A2 effects a rotation of the articulated interconnecting assembly 20 about the lower pivot point 92. The movement of the actuator and the accompanied movement of the articulated interconnecting assembly are illustrated in e.g. FIGS. 4a and 4c. In other words, a rotation of the articulated interconnecting assembly 20 about the lower pivot point 92 is effected by a linear movement of the actuator 64 along the actuator axial direction A2. Generally, the actuator 64 is configured to drive and lock the support assembly 100 in the various states. The driving capability of the support assembly is provided by operating the actuator, e.g. by the control unit. The self-locking capability is typically provided by using an actuator configured to lock in given position. By way of example, the actuator can be a hydraulic cylinder containing a liquid fluid enclosed in an inner volume of the cylinder. In this manner, the actuator enables the support assembly to be set in an outermost position, corresponding to the extended state (extracted state) and in an innermost state, typically corresponding to the retracted state. It is to be noted that hydraulic cylinders working as actuators are well-known in the art, and thus not further described herein.

In other words, the support assembly 100 is typically a self-driven configuration. In addition, or alternatively, the support assembly 100 is a self-locking configuration.

Figure 4D:
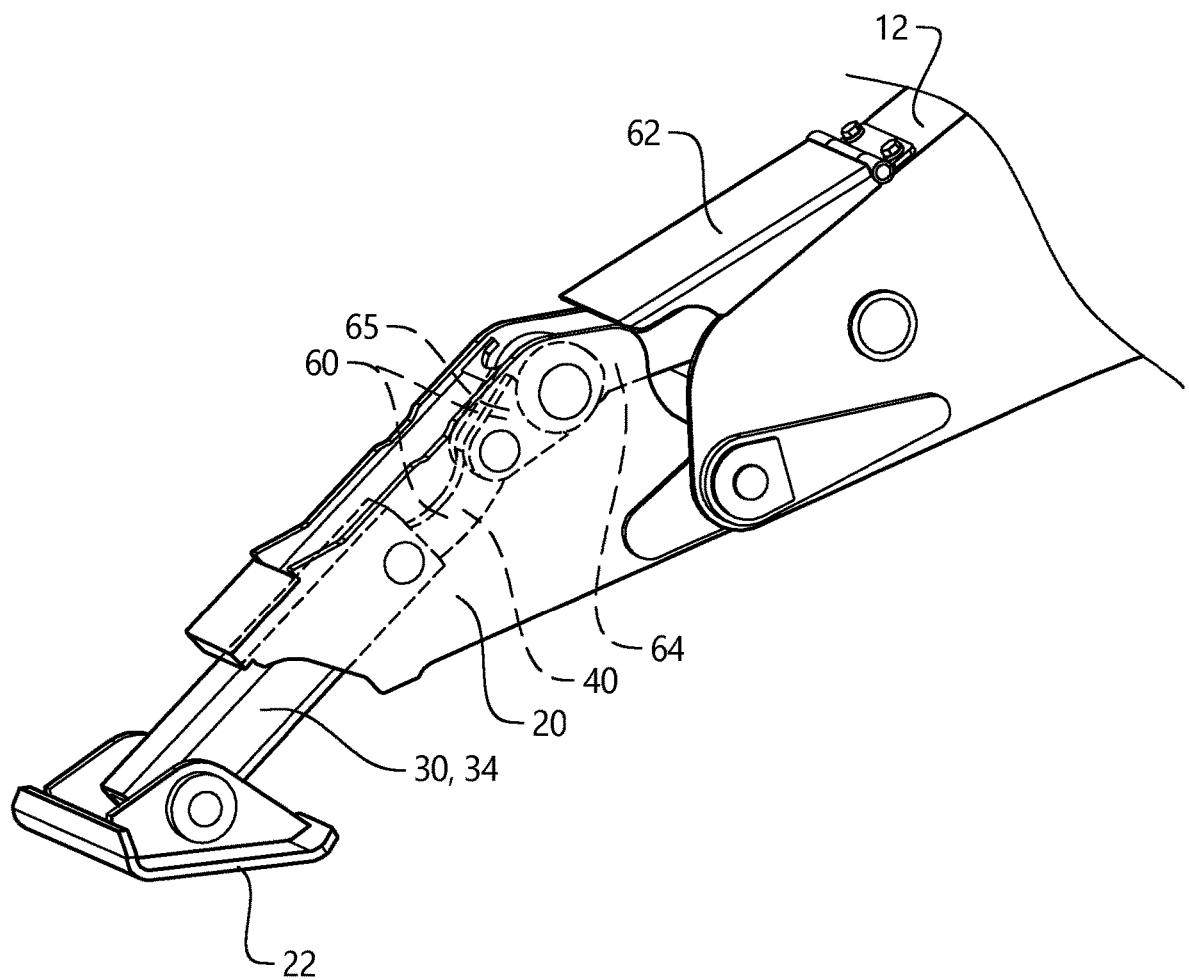
FIG. 4d is a perspective view of an example embodiment of the support assembly, in which the support assembly is in the extracted position to engage with the ground and to provide support to the working machine.
Figure 4E:
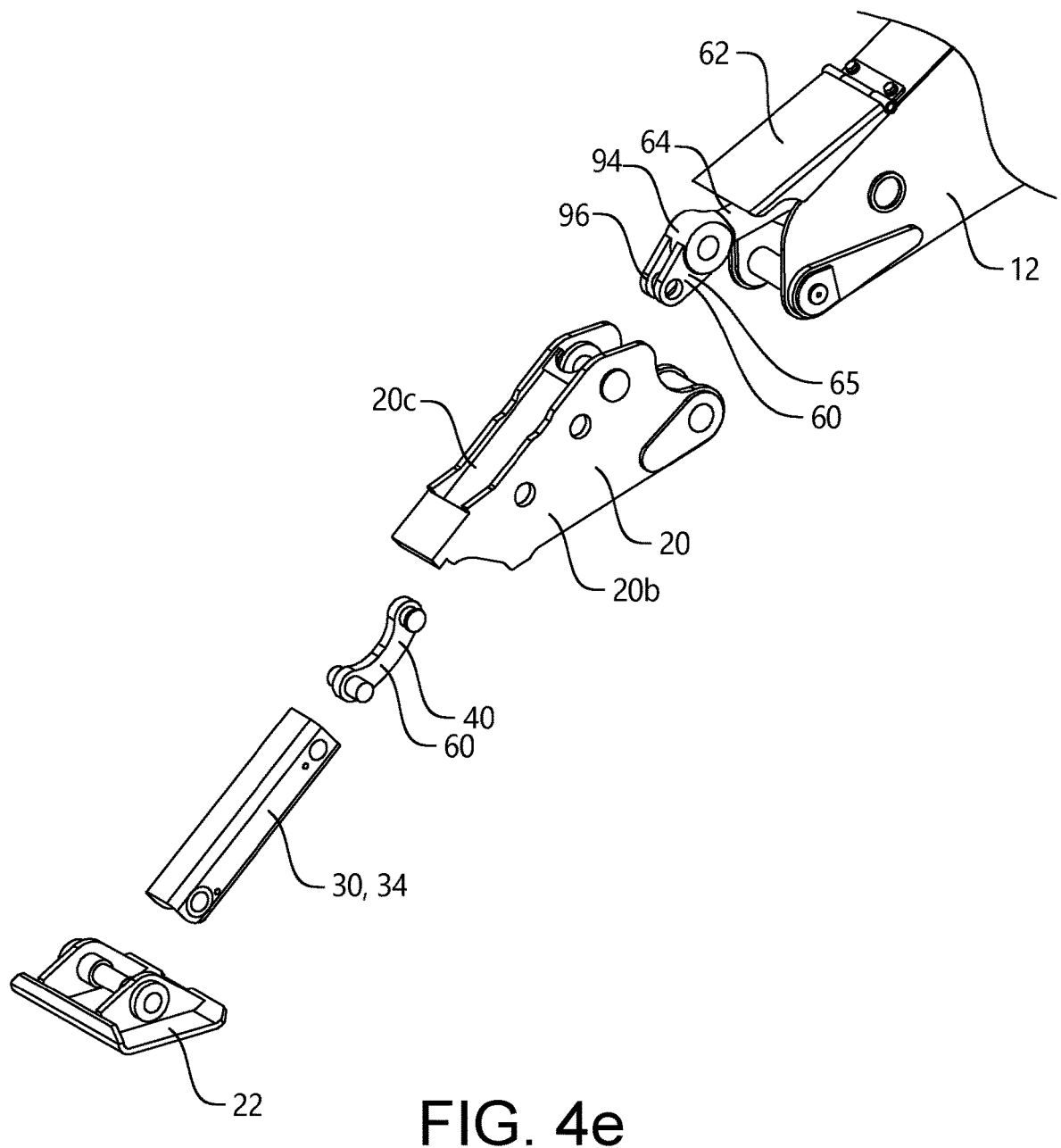
FIG. 4e is an exploded view of an example embodiment of some parts of the support assembly according to the present invention.
Figure 4F:
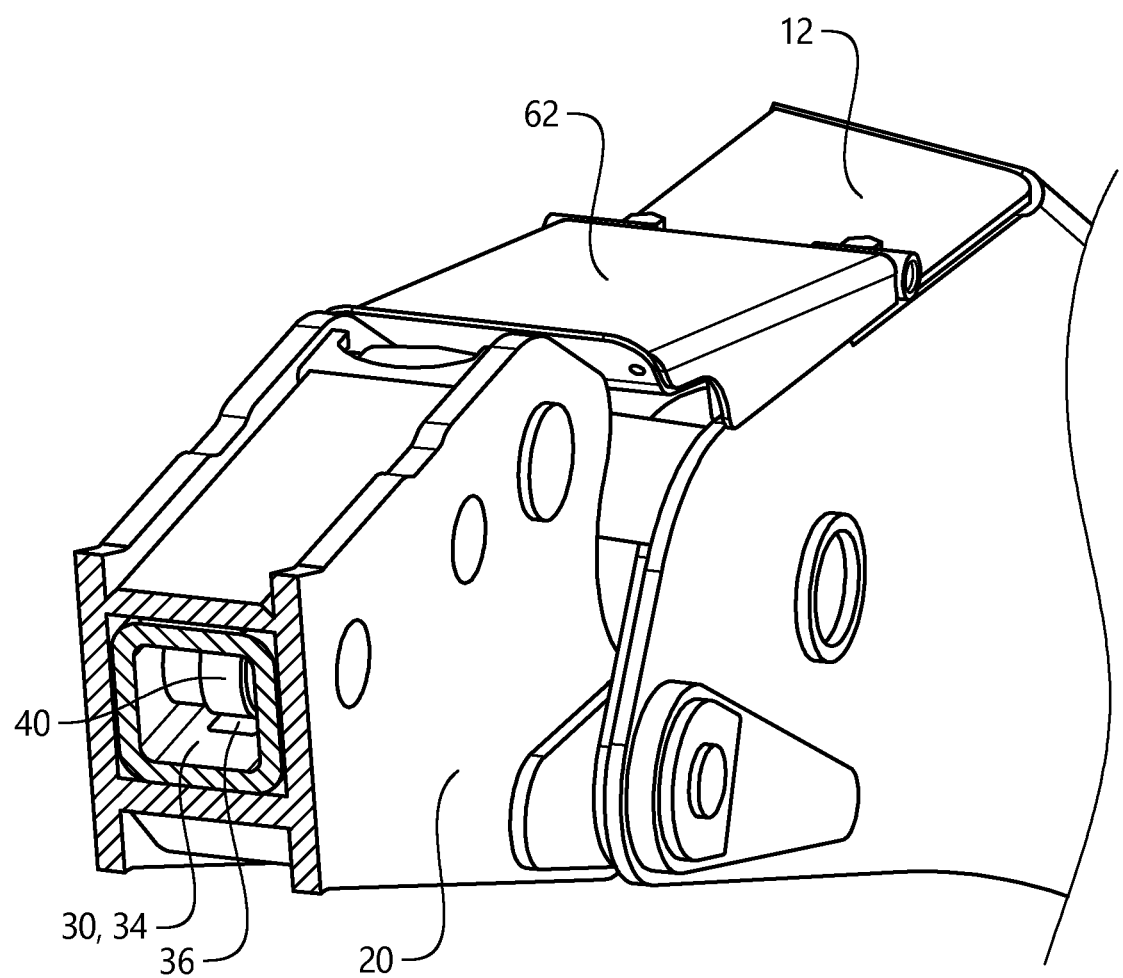
FIG. 4f is a cross-sectional perspective view of an example embodiment of some parts of the support assembly according to the present invention.

Moreover, the support assembly optionally includes a cover 62, which is illustrated in FIGS. 4d, 4e and 4f. The cover is connected to the support assembly 100. In addition, or alternatively, the cover is connected to the lower frame 12. The cover is typically pivotable connected to the support assembly or the lower frame. The cover is configured to protect the actuator 64, the linkage arm 65 and other components of the support assembly.

It is to be noted that any numerical designations, such as "first" or "second" are illustrative only and are not intended to limit the scope of the invention in any way.

It is to be understood that the present invention is not limited to the embodiments described above and illustrated in the drawings; rather, the skilled person will recognize that many changes and modifications may be made within the scope of the appended claims. For instance, it should be readily appreciated that although some components are mentioned as having circular cross sections, e.g. the tubular extension member, the dimensions and shapes of these components may likewise be provided in other shapes and dimensions, such as components having cross sections resembling oval-, rectangular- and triangular-shaped cross sections, or any other conceivable cross-section, as long as the components can provided their functions.

The invention claimed is:

1. A support assembly for supporting a vehicle, such as a working machine, said support assembly comprising:
   an articulated interconnecting assembly pivotable connectable to a lower part of the working machine;
   a telescopic arrangement connected to said articulated interconnecting assembly and comprising a guiding frame and a telescopic extension member displaceable arranged relative the guiding frame;
   a foot connected to said telescopic extension member; and
   an articulated linkage arrangement having a linkage arm and a curved connecting rod, said linkage arm being connectable at one end to an actuator for effecting a movement of said articulated interconnecting arrangement and at a second end pivotable connected to one end of the curved connecting rod, while said curved connecting rod further being pivotable connected to the telescopic extension member at a second end, wherein said telescopic extension member comprises a channel for accommodating a portion of the curved connecting rod such that said portion of the curved connecting rod is permitted to move along said channel of said telescopic extension member.

2. Support assembly according to claim 1, wherein said telescopic extension member is a tubular member having an inner volume defined by a circumferential outer segment, said channel being disposed on a bottom part of said outer segment and extending a substantial part in an axial direction.

3. Support assembly according to claim 2, wherein said portion of said curved connecting rod is disposed in said inner volume of said extension tubular member.

4. Support assembly according to claim 2, wherein said portion of said curved connecting rod is pivotable connected to an inner surface of said outer segment of said extension tubular member.

5. Support assembly according to claim 1, wherein the guiding frame of the telescopic arrangement is an integral part of the said articulated interconnecting assembly.

6. Support assembly according to claim 1, wherein the guiding frame is an outer guiding member and the extension member is an inner tubular member.

7. Support assembly according to claim 1, wherein the support assembly comprises the actuator being operable to move the support assembly between a retracted position and an extracted position, in which the foot is permitted to engage with the ground to provide support to the vehicle.

8. Support assembly according to claim 7, wherein the actuator is connected to an upper part of the articulated interconnecting assembly.

9. Support assembly according claim 8, wherein a rotation of said articulated interconnecting assembly about a pivot point is effected by a linear movement of the actuator along an actuator axial direction.

10. Support assembly according to claim 1, wherein the orientation of a protruding part of the curvature of the curved connecting rod correspondence with the orientation of the channel.

11. Support assembly according to claim 1, wherein said assembly is a self-driven and self-locking configuration.

12. A support assembly system having a lower part and comprising a first support assembly and a second support assembly according to claim 1, the first support assembly and the second support assembly being connected on opposite sides of the lower part of the support assembly system.

13. A vehicle comprising a vehicle frame having the support assembly according to claim 1, said support assembly being mounted to one of a front end or a rear end of the vehicle frame.

* * * * *